(12) United States Patent
Gendler et al.

(10) Patent No.: US 9,367,080 B2
(45) Date of Patent: Jun. 14, 2016

(54) APPARATUS, SYSTEM, AND METHOD FOR PROVIDING CLOCK SIGNAL ON DEMAND

(75) Inventors: Alexander Gendler, Kiriat Motzkin (IL); Arye Albahari, Kiriat Yam (IL); Yair Talker, Binyamina (IL); Yossi Ben Simon, Karmiel (IL); Inbar Weintrob, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 13/334,672

(22) Filed: Dec. 22, 2011

(65) Prior Publication Data

US 2013/0166939 A1    Jun. 27, 2013

(51) Int. Cl.
*G06F 1/32* (2006.01)
*G06F 1/10* (2006.01)

(52) U.S. Cl.
CPC ........................................ *G06F 1/10* (2013.01)

(58) Field of Classification Search
USPC .......... 713/300, 320, 322, 323, 324, 600, 601
See application file for complete search history.

(56) References Cited

U.S. PATENT DOCUMENTS

| | | | |
|---|---|---|---|
| 5,996,083 A * | 11/1999 | Gupta et al. | 713/322 |
| 6,983,389 B1 * | 1/2006 | Filippo | 713/324 |
| 2002/0138777 A1 * | 9/2002 | Feierbach | 713/324 |
| 2006/0106985 A1 * | 5/2006 | Barrick | G06F 9/383 711/125 |
| 2009/0228729 A1 * | 9/2009 | Lin | 713/322 |
| 2012/0066455 A1 * | 3/2012 | Punyamurtula | G06F 12/0862 711/122 |

* cited by examiner

*Primary Examiner* — Paul Yanchus, III

(57) ABSTRACT

Described herein are apparatus, system, and method for providing clock signal on demand. The method comprises determining an indication of clock signal usage in multiple hardware logic units; generating an enable signal according to the indication; and gating or un-gating the clock signal for clock islands of at least a hardware logic unit, of the multiple hardware logic units, in response to a logic level of the enable signal, wherein the clock islands are part of a global clock distribution network and are operable to be enabled or disabled independently.

14 Claims, 7 Drawing Sheets

US 9,367,080 B2

APPARATUS, SYSTEM, AND METHOD FOR PROVIDING CLOCK SIGNAL ON DEMAND

FIELD OF THE INVENTION

Embodiments of the invention relate generally to the field of processors. More particularly, embodiments of the invention relate to an apparatus, system, and method for providing clock signal on demand.

BACKGROUND

As demand for low power consumption processors is increasing, reducing dynamic power consumption in switching transistors is gaining interest. One way to reduce dynamic power consumption is by clock gating. The term "clock gating" herein refers to stopping the clock signal from propagating to a logic unit so that the transistors in the logic unit receiving the clock signal do not switch. The term "clock un-gating" herein refers to resuming the clock signal to propagate to a logic unit so that the transistors in the logic unit receiving the clock signal are capable of switching.

Clock signals are distributed in a processor by a grid of tiles of metal wires which are shorted together to provide the same clock signal to all logic units of the processor. FIG. 1 illustrates a snapshot of a clock distribution network 100 with a shorted grid 103 of wires of metal to provide the same clock signal clki at roughly the same time to all points of the shorted grid 103. The clock distribution network 100, in this example, provides the clock signal clki to three functional logic blocks 105, 106, and 107. The clock signal clki is generated by a phase locked loop (PLL) 101 and buffered out to the grid 103 via a spine 102, wherein the spine 102 is a network of buffers and/or inverters to drive the clock signal clki to the grid 103. A logic unit 108 generates an enable signal 109 for all clock drivers 104 that drive the clock signal clki to the grid 103. The enable signal 109 is used for clock gating and un-gating, i.e. to stop and resume clock signal propagation in the functional blocks 105, 106, and 107.

However, clock gating the clock signal clki in the grid 103 of tiles to reduce dynamic power consumption for a particular logic unit (e.g., one of 105, 106, or 107) stops the clock signal clki from propagating to all logic units—all units 105, 106, and 107. Clock gating all logic units 105, 106, and 107 of the processor may shut down the operations of the processor completely.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the invention relate to an apparatus, system, and method for managing clock signal propagation on demand. In the embodiments discussed herein, clock signal is propagated to the logic blocks when the logic blocks require the clock signal for processing its data and/or for executing its instruction set. In one embodiment, a logic unit dynamically determines when the logic blocks in a processor need the clock signal to function. In such an embodiment, an early indication of clock signal usage is determined to enable clock gating for a logic block in the processor which is going to be inactive for a certain number of future clock cycles.

For example, the logic unit monitors the current executing instruction set and/or upcoming instruction sets to be executed and determines which logic blocks in the processor will be activated by the execution of the upcoming instruction set. The logic unit then disables propagation of clock signal to the logic blocks that will remain inactive during the execution of the upcoming instruction set. The logic unit also determines when the clock signal needs to be enabled again for the logic block to function in the future. In such an embodiment, the logic unit enables the propagation of the clock signal, i.e. un-gates the clock propagation, at least a clock cycle before the logic block is supposed to operate.

Figure 1:
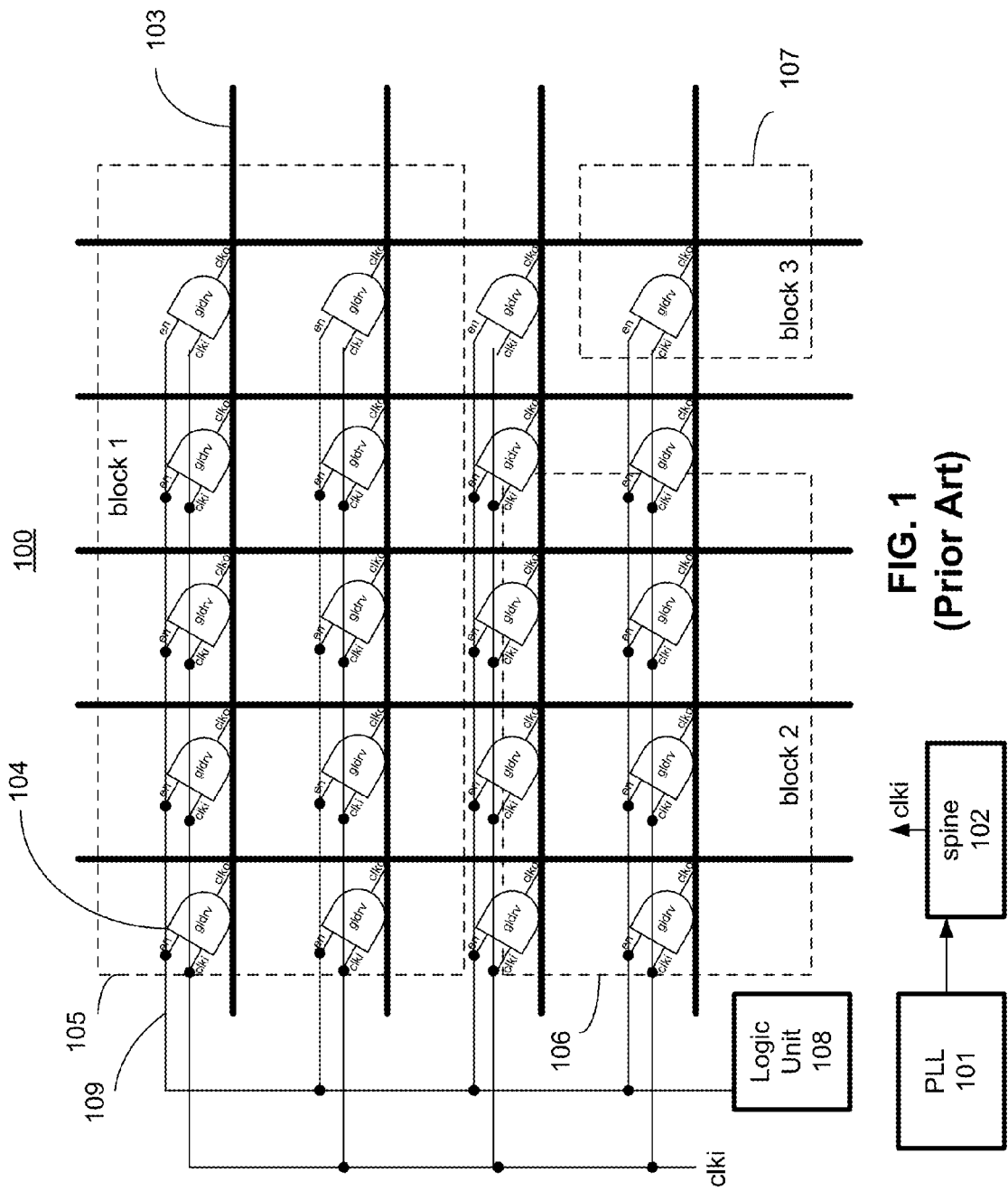
FIG. 1 is a clock distribution network consisting of a shorted grid of metal wires to provide the same clock signal to various functional logic blocks.

In one embodiment, the clock grid 103 of FIG. 1 is replaced with clock islands that can be independently gated for a logic block without gating the clock signal from propagating to other logic blocks. In such an embodiment, the logic unit identifies sets of clock islands that can be gated or un-gated independently based on which logic blocks will be inactive or active for foreseeable future clock cycles. In one embodiment, different sets of clock islands are connected to different spine networks. In such an embodiment, the clock signal may be gated at the spine network to disable clock propagation to the sets of clock islands of logic blocks that are identified to be inactive for the future clock cycles. The term "spine" herein refers to a network of buffers and/or inverters to drive a clock signal from a clock generator (e.g., a PLL) to sets of clock islands of one or more logic blocks of the processor. In one embodiment, the spine network is part of a global clock distribution network to provide clock signals to sets of clock islands in functional logic blocks.

The technical effect of determining early indications of which logic blocks and their corresponding sets of clock islands can be gated is that greater power savings can be realized compared to the clock distribution network of FIG. 1 that has shorted grid tiles 103. Replacing the shorted grid tiles 103 of FIG. 1 with sets of clock islands reduces overall metal capacitance of the clock distribution network. By gating sets of clock islands for functional logic blocks that are inactive, further metal capacitance of the clock distribution network is reduced over the shorted grid tiles 103 of FIG. 1.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Figure 2A:
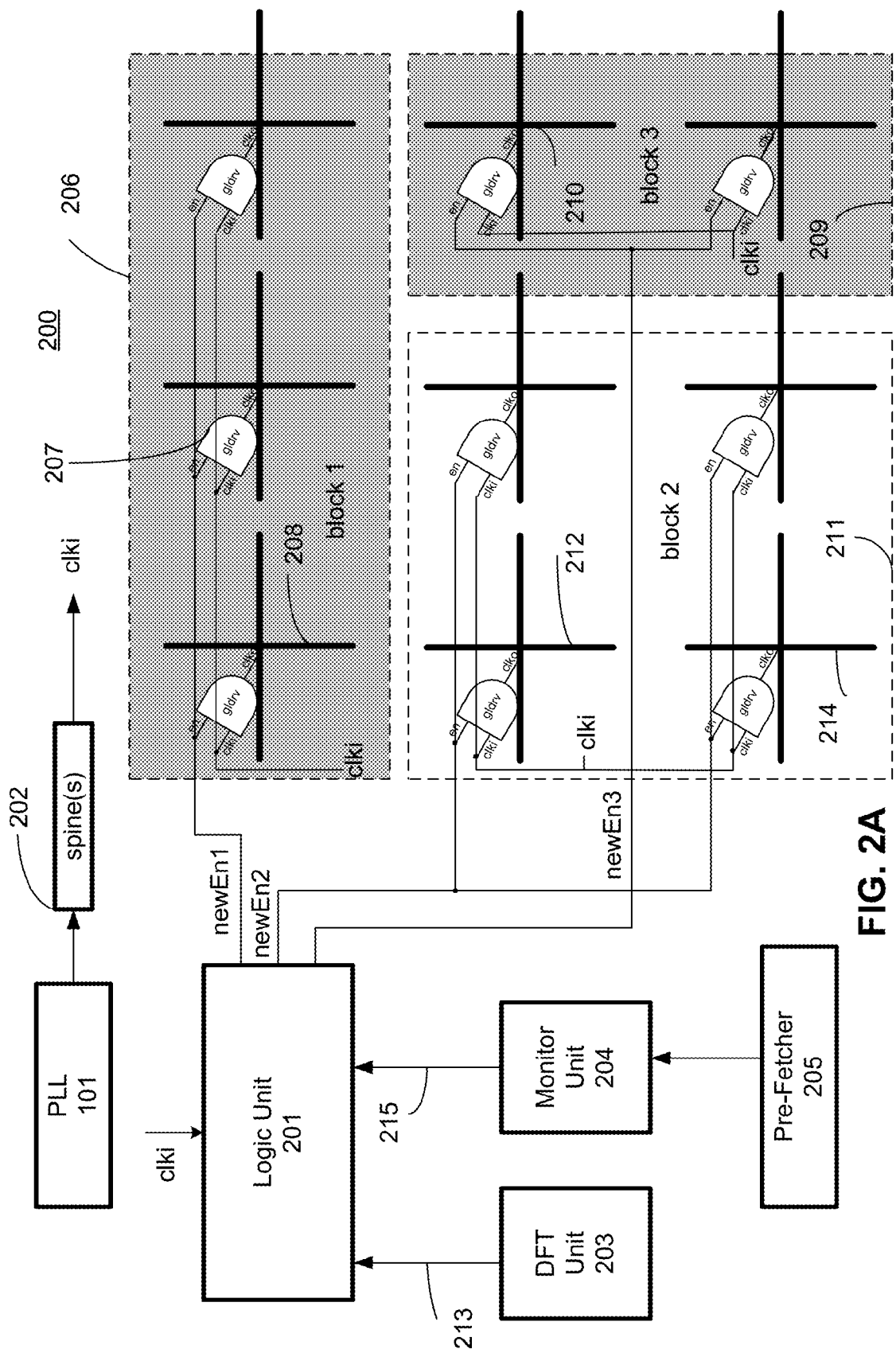
FIG. 2A is a clock distribution network comprising sets of clock islands and logic for managing clock signal propagation on demand, according to one embodiment of the invention.

FIG. 2A is a clock distribution network 200 comprising clock islands and logic for managing clock signal propagation on demand, according to one embodiment of the invention. In one embodiment, the clock distribution network 200 comprises a logic unit 201 which is operable to generate clock enable signals (newEn1, newEn2, newEn3, etc) for one or more functional logic blocks 206, 209 and 211. In one embodiment, the functional logic blocks 206, 209, 211 include a cluster of blocks.

For example, the functional logic blocks 206, 209, 211 are Mid-Level Cache (MLC), Lower-Level Cache (LLC), Floating Point Unit (FPU), Integer Unit (IU), Register File (RF), etc. The above examples are not meant to be an exclusive list of functional logic blocks. Other functional logic blocks not listed are also contemplated herein. The embodiments herein describe a processor as single processor, wherein the single processor comprises: one or more hardware processing cores, wherein the functional logic blocks, i.e. multiple hardware logic units, are positioned in the one or more hardware processing cores, and wherein the multiple hardware logic units include: FPU, integer unit, MLC, etc.

In one embodiment, the clock distribution network 200 comprises a spine network 202 to distribute the clock signal clki to one or more sets of clock islands (e.g., islands 208, 210, 212, 214) that provide clock signal clki to one or more functional logic units—206, 209, 210—which are also referred to as hardware logic units. The spine network 202 receives a clock signal from a phase locked loop (PLL) 101 and drives the clock signal to clock buffer gates 207 coupled to each clock island. Unlike the shorted grid/mesh 103 of FIG. 1, there is no shorted grid/mesh in the clock distribution network 200, according to one embodiment of the invention. In such an embodiment, one or more sets of clock islands can be gated independent of one another to gate clock signal propagation for individual functional logic blocks.

In one embodiment, the logic unit 201 determines which set of clock islands can be gated based on the future usage of the clock signal clki by the functional logic blocks 206, 209, and 211. For example, the logic unit 201 determines that the functional logic blocks 206 and 209 will be inactive in foreseeable future, so the logic unit 201 gates the clock signals to the clock islands 208 and 210 via the enable signals newEn1 and newEn3. In this example, the functional logic block 211 continues to receive un-gated clock signal clki while the functional logic blocks 206 and 209 do not consume dynamic/switching power because the clock signal clki is gated by the buffer gates 207.

In one embodiment, the logic unit 201 of clock distribution network 200 has a monitor unit 204, or is coupled to a monitor unit 204, to monitor current and upcoming instruction sets for execution by the processor. In one embodiment, the monitor unit 204 monitors a pre-fetcher unit 205, which is aware of the upcoming instructions to be executed, and informs the logic unit 201 about which functional logic blocks can be gated and/or un-gated.

For example, the monitor unit 204 monitors current and to be executed instruction sets to predict and/or determine the activity of various functional logic blocks in the processor. In such an embodiment, the monitor unit 204 provides its indication to the logic unit 201 via a signal 215 so that the logic unit 201 may generate the appropriate clock enable signals. In one embodiment, the monitor unit 204 predicts with high confidence by evaluating the current instruction set which functional logic blocks need to be active and which can be made inactive without hindering the operation of the processor.

For example, the pre-fetcher 205 fetches the next instruction to be executed by the processor to be a multiplication of two integers. In this example, the monitor unit 204 and/or the logic unit 201 determines that the integer unit of the processor will be used to execute the instruction set and so the integer unit cannot be gated. The monitor unit 204 and/or the logic unit 201 also determines that the floating point unit (FPU) can be gated because it does not need to be activated during the multiplication of two integers. In such an embodiment, the logic unit 201 generates clock enable signals that gate the clock signal from propagating to the FPU while another enable signal keeps the clock signal propagating to the integer unit. In this example, the FPU does not consume dynamic or switching power while the integer unit consumes dynamic power.

Continuing with the above exemplary embodiment, the logic unit 201 also determines from the pre-fetcher 205 whether the FPU needs to be active, and when. If the logic unit 201 determines that the FPU will be active because the pre-fetcher 205 indicates that the next instruction to be executed is a multiplication of decimal numbers, then the logic unit 201 generates a corresponding enable signal for the FPU which un-gates the FPU at least one clock cycle before the FPU is required to be activated by the execution of the new instruction. In one embodiment, the logic unit 201 includes or is coupled to a Design for Test (DFT) unit 203 that generates DFT signals 213 to bypass the logic unit or to enable or disable the functional logic blocks by un-gating or gating their respective clock signals. In one embodiment, identifying whether a set of clock islands is to be gated or un-gated is performed independently for each functional logic block and in parallel.

While the embodiments discussed herein show the logic unit 201 as a separate logic unit from the DFT unit 203 and the monitor unit 204, the logic unit 201 may include both the DFT unit 203 and monitor unit 204 without changing the essence of the embodiments of the invention.

Figure 2B:
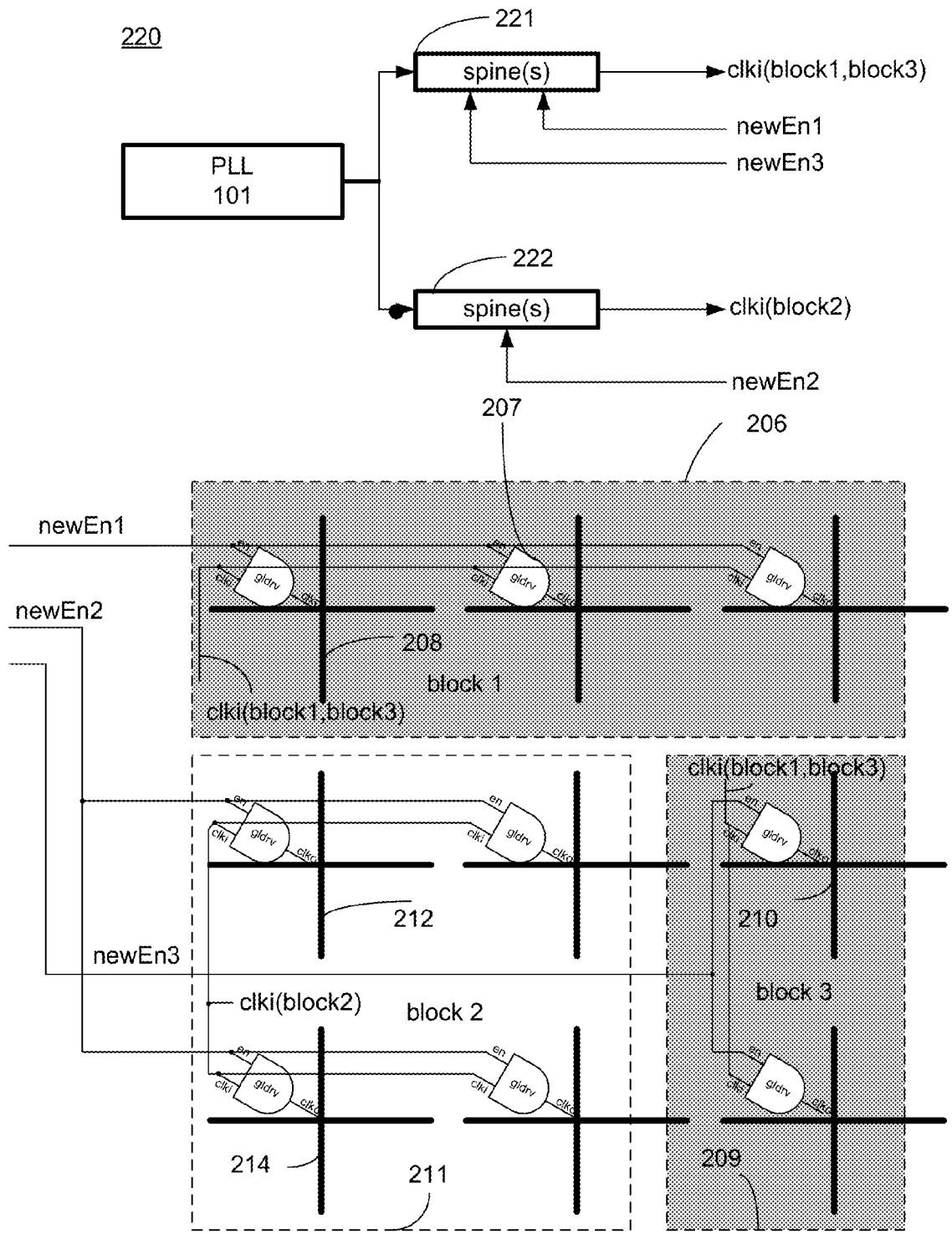
FIG. 2B is a clock distribution network for managing clock signal propagation on demand, according to another embodiment of the invention.

FIG. 2B is a clock distribution network 220 for managing clock signal propagation on demand, according to another embodiment of the invention. So as not to repeat the embodiments discussed herein, only the differences between FIG. 2A and FIG. 2B are discussed.

In one embodiment, the clock distribution network 220 comprises one or more spine networks, for example 221 and 222, that distribute corresponding clock signals clki(block 1, block3) and clki(block2) independently to two or more sets of clock islands (e.g., islands 208, 210, 212, 214) that provide clock signals to the functional logic units-206, 209, 211. In one embodiment, the clock enable signals—newEn1, newEn2, newEn3—are also used to gate the clock signal to be distributed by the spines 221 and 22. In such an embodiment, the logic unit 201 determines which set of clock islands can be gated and then identifies which of the one or more spine networks 221 and 222, that provide the clock signals to set of clock islands, can be gated.

For example, the logic unit 201 determines that the functional logic blocks 206 and 209 will be inactive in foreseeable future, so the logic unit 201 gates the clock signals to the clock islands 208 and 210. Continuing with the example discussed with reference to FIG. 2A, assume functional logic blocks 206 and 209 are part of the FPU while functional logic block 211 is an integer unit. When the logic unit 201 determines from the pre-fetcher 205 that the next instruction only requires the integer unit 211 to be active, then it will generate enable signals newEn1 and newEn2 to gate the local clock buffer gates 208 of the clock islands 208 and 210 and their corresponding spine network 221. In this example, the logic unit 201 generates an enable signal newEn2 to keep the clock islands (212, 214) of the integer unit 211 and its corresponding spine network 222 un-gated. In such an embodiment, the dynamic power consumption is lowered because the buffers and/or inverters in the spine network 221 and the transistors using the clock signal in the functional logic blocks 206 and 209 are not switching during the time the spine network 221 and the functional logic blocks 206 and 209 are gated.

In one embodiment, the monitor unit 204 determines the number of clock cycles after which functional logic blocks need to be activated. In one embodiment, the monitor unit 204 comprises a shift register with a pre-determined number of registers (not shown) coupled together in a chain. For example, the shift register pushes a logical one through the registers on every clock cycle to keep track of a number of clock cycles needed for the function blocks to be activated. When the logical one appears at the output of the last register in the chain, the logic unit 201 decides to un-gate the sets of clock islands. In other embodiments, other implementations of the shift register may be used to track the number of clock cycles before instructing the logic unit 201 to gate or un-gate the sets of clock islands. In one embodiment, the shift registers are part of the logic unit 201.

In one an embodiment, the logic unit 201 un-gates the sets of clock islands to the functional logic blocks at least one cycle before the functional logic blocks are expected to be active to execute the upcoming instruction. This process is also referred herein as waking up the functional logic blocks. By waking up the functional logic blocks at least one clock cycle before they are expected to be active, there is no performance degradation (in terms of number of clock cycles needed to execute an instruction) to the processor's performance by the embodiments discussed herein.

Figure 3:
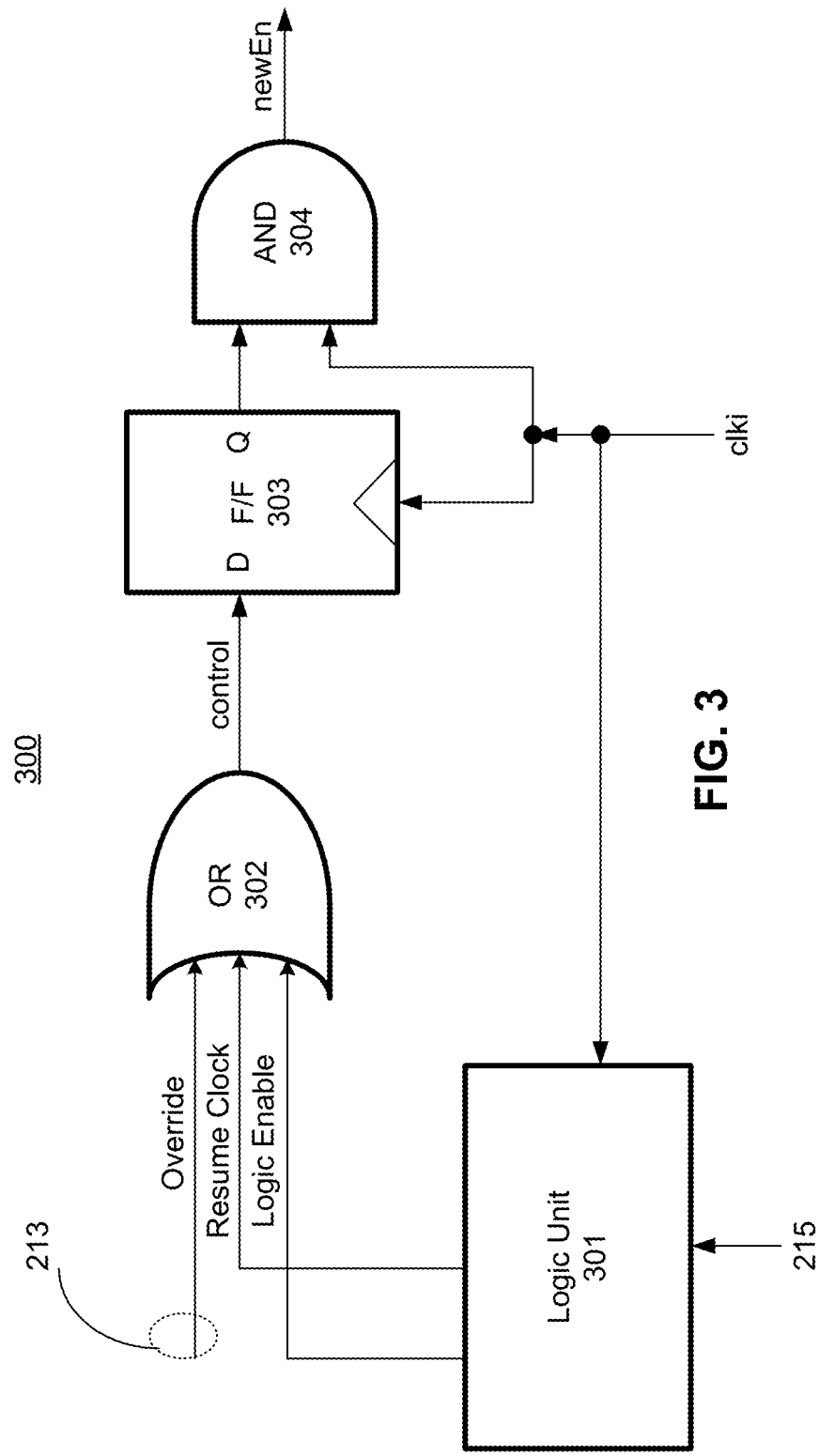
FIG. 3 is a logic unit for generating a clock enable signal for managing clock signal propagation on demand, according to one embodiment of the invention.

FIG. 3 is the logic unit 300/201 for generating a clock enable signal for managing clock signal propagation on demand, according to one embodiment of the invention. FIG. 3 is described with reference to FIGS. 2A-B. In one embodiment, the logic unit 300/201 includes a logic unit 301 to receive a signal 215 from the monitor unit 204. In such an embodiment, the logic unit 301 determines which functional logic block and their corresponding sets of clock islands can be gated or need to be un-gated. For example, the logic unit 301 receives via signal 215 an indication from the pre-fetcher 205 or the monitor unit 204 about the upcoming instructions to be executed, and the number of cycles needed to execute the instruction by the functional logic blocks. In one embodiment, the logic unit 301 generates the Logic Enable signal indicating whether a set of clock islands for one or more functional logic blocks need to be gated or un-gated.

In one embodiment, the logic unit 301 comprises a counter (not shown) that is set to a count value which is the number of clock cycles needed by the functional logic block to remain active to perform/execute its instruction. In this embodiment, the counter operates with un-gated clock signal. While the embodiments herein describe the function of the counter as a down counter, counting down on every un-gated clock signal clki from a preset value, the counter can be replaced with an up counter, counting up on every un-gated clock signal clki from a reset value to a pre-determined count value without changing the essence of the embodiments of the invention.

In one embodiment, when the logic unit 301 determines from the pre-fetcher 205 that a particular function logic block needs to remain active for a certain number of clock cycles, the counter is preset to a count value. In such an embodiment, when the counter counts down on every clki cycle and the count value reaches zero, then the logic unit 301 generates the Logic Enable signal to gate the set of clock islands and/or corresponding spine network for the functional logic block because the functional logic block is not expected to be active when the counter value reaches zero.

In one embodiment, when the logic unit 301 determines from the pre-fetcher 205 that a particular function logic block needs to remain active for a certain number of additional clock cycles, the counter is preset to a new count value and it begins to count down again. In such an embodiment, the functional logic block is given additional time to remain active before the Logical Enable signal is generated to disable to set of clock islands and/or the corresponding spine network that provides clock signal to the functional logic block.

In one embodiment, the logic unit 301 generates a Resume Clock signal at least one clock signal prior to when a functional logic block is expected to be active to execute an instruction or to perform its expected operation.

In one embodiment, the Logic Enable signal is received by an OR gate 302 which performs a logical OR operation between the Logic Enable signal, Resume Clock signal, and an Override Signal. In one embodiment, the Override signal is part of the signal 213 from the DFT unit 203. In such an embodiment, the Override signal provides additional means for generating the newEn signal in case the logic unit 301 malfunctions.

While the embodiments herein describe two separate signals—Logical Enable and Resume Clock signals—for gating and un-gating a set of clock islands and/or corresponding spine networks, the function of the Logical Enable and Resume Clock signals can be combined in a single enable signal, according to one embodiment of the invention. For example, the counter can be disabled for un-gating a set of clock islands when the logic unit 301 determines that the set of clock islands corresponding to the functional logic block need to be active for the functional logic block to execute its instruction. In this example, the set of clock islands is gated when the counter value reaches zero value from a preset value, and the set of clock islands is un-gated as long as the counter value remains non-zero.

In one embodiment, the output (control signal) of the OR gate 302 is synchronized by a sequential logic unit 303 with an un-gated clock signal clki. One reason for applying an un-gated clock signal clki to sample the control signal with the un-gated clki signal is to ensure that the logic unit 300/201 is not disabled. In one embodiment, the sequential logic unit 303 is an edge triggered flip-flop (F/F). In one embodiment, the output of the sequential logic unit 303 is ANDed with the un-gated clock signal clki by an AND gate 304 to generate the newEN signal.

In one embodiment, the newEn signal from the AND gate 304 is sampled by a Phase-2 latch (falling edge triggered latch) and then transmitted to the clock driver 207 in the clock island. If the newEn signal is not generated from a falling edge of clki signal, the newEn signal may exhibit a glitch on the clock signal driven by the clock driver 207 resulting in distorted duty cycle. The term "duty cycle" refers to a ratio of duration of high level phase to low level phase of a signal period. For example, a signal with equal high and low level phases has a 50% duty cycle. To solve the above problem of distorted duty cycle, in one embodiment the output of the sequential logic unit 303 is generated from a phase-2 latch and not from a rising edge of the clki signal or from a phase-1 latch (rising edge triggered latch).

Figure 4:
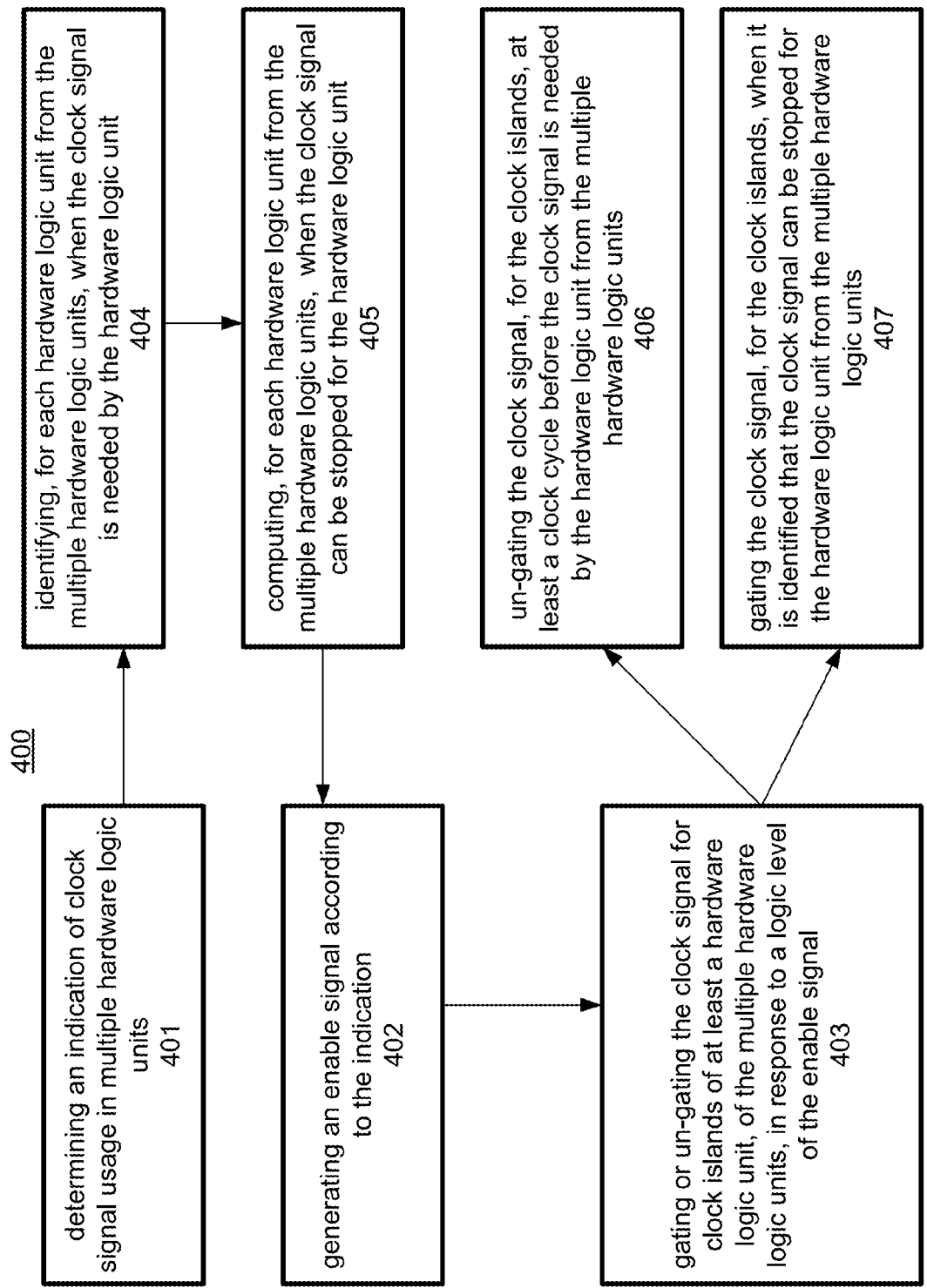
FIG. 4 is a method flowchart for managing clock signal propagation on demand, according to one embodiment of the invention.

FIG. 4 is a method flowchart 400 for managing clock signal propagation on demand, according to one embodiment of the invention. Although the blocks in the flowchart 400 are shown in a particular order, the order of the actions can be modified. Thus, the illustrated embodiments can be performed in a different order, and some actions/blocks may be performed in parallel. Additionally, one or more actions/blocks can be omitted in various embodiments of managing clock signal propagation on demand. The flowchart of FIG. 4 is illustrated with reference to the embodiments of FIGS. 2-3.

At block 401, the logic unit 201 determines an indication of clock signal usage in one more functional logic blocks (also called hardware logic units). In one embodiment, at block 404 the logic unit 201 identifies for each functional logic unit when the clock signal is needed by the functional logic unit. In one embodiment, at block 405 the logic unit 201 computes or determines when the clock signal can be stopped for each functional logic unit. As discussed herein, the monitor unit 204 monitors the pre-fetcher 205 to determine which functional logic blocks and their corresponding sets of clock islands need the clock signal and which can be gated.

At block 402, the logic unit 201 uses the information from the monitor unit 204 and/or the pre-fetcher 205 to generate enable signals (e.g., newEn1, newEn2, newEn3, etc) for functional clock blocks and their corresponding clock islands.

At block 403, the logic level of the enable signals determines whether a set of clock islands will be gated or un-gated. As discussed with reference to FIG. 2A, the enable signals gate or un-gate the sets of clock islands for functional logic blocks that are not expected to be active to execute the upcoming instruction. In one embodiment, as discussed with reference to FIG. 2B, the spine network, corresponding to the set of clock islands which are being indicated to be gated, are also gated. In one embodiment, the gating or un-gating of the clock signal occurs prior to transmitting the clock signal from spine network to the clock islands.

In one embodiment, at block 406 the clock signal for a set of clock islands is un-gated at least a clock cycle before the clock signal is expected by the corresponding functional logic block to execute the instruction. In one embodiment, at block 407 the logic unit 201 gates the clock signal to the set of clock islands and/or the corresponding spine network when it determines by means of the monitor unit 204 and/or the pre-fetcher 205 that the functional logic block is not expected to be active for executing the upcoming instruction.

Figure 5:
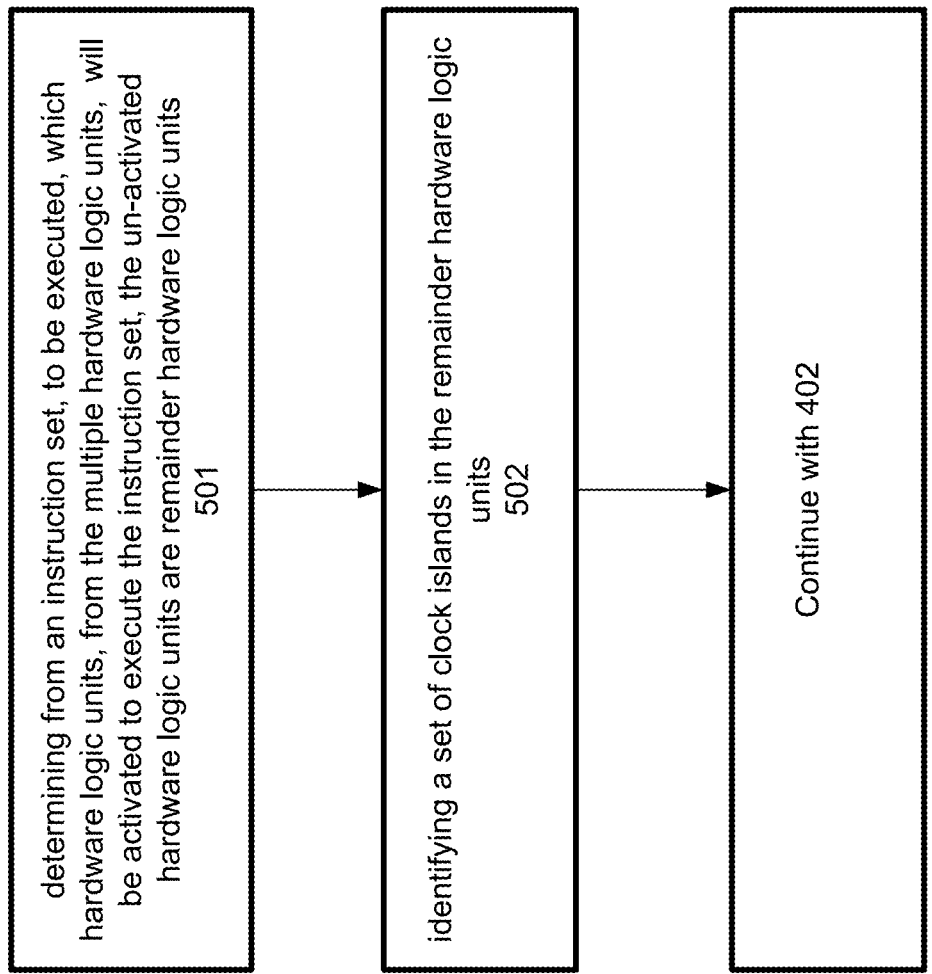
FIG. 5 is a method flowchart for managing clock signal propagation on demand by monitoring to be executed instruction sets, according to one embodiment of the invention.

FIG. 5 is a method flowchart 500/405 for managing clock signal propagation on demand by monitoring to be executed instruction sets, according to one embodiment of the invention. Although the blocks in the flowchart 500 are shown in a particular order, the order of the actions can be modified. Thus, the illustrated embodiments can be performed in a different order, and some actions/blocks may be performed in parallel. Additionally, one or more actions/blocks can be omitted in various embodiments of managing clock signal propagation on demand. The flowchart of FIG. 5 is illustrated with reference to the embodiments of FIGS. 2-4.

At block 501, the monitor unit 204 and/or the logic unit 201 determines from the pre-fetcher 205 which instruction set is about to be executed, and which functional logic blocks are expected to be active to execute the instruction set and which functional logic blocks are expected to remain inactive during the execution of the instruction, which are also called the remainder functional logic blocks. In one embodiment, the monitor unit 204 and/or the logic unit 201 also determines the number of clock cycles the functional logic blocks are expected to be active and inactive.

At block 502, the logic unit 201 identifies from the information collected from the monitor unit 204 and/or the pre-fetcher 205 the sets of clock islands corresponding to the functional logic blocks (remainder functional logic blocks) that are expected to remain inactive during the execution of the instruction. The logic unit 201 then generates the enable signal at block 402 to gate the set of clock islands for the functional logic blocks (remainder functional logic blocks) that are expected to remain inactive during the execution of the instruction. In one embodiment, the identifying of whether a set of clock islands is to be gated or un-gated is performed independently for each functional logic block and in parallel.

Figure 6:
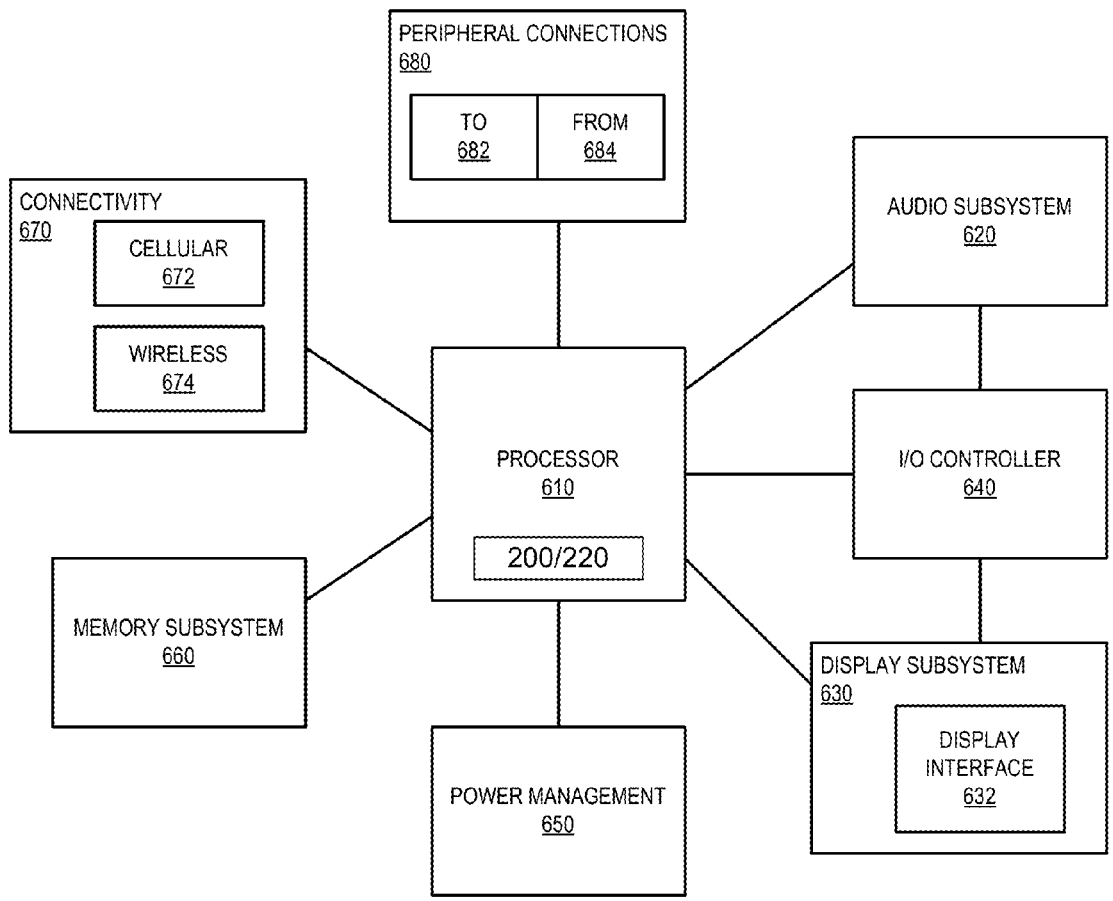
FIG. 6 is a system-level diagram of a device comprising a processor comprising the clock distribution network having sets of clock islands and logic for managing clock signal propagation on demand, according to one embodiment of the invention.

FIG. 6 is a system-level diagram 600 of a device comprising a processor comprising the clock distribution network 200/220 having clock islands and logic for managing clock signal propagation on demand, according to one embodiment of the invention. FIG. 6 is a block diagram of an embodiment of a mobile device in which flat surface interface connectors could be used. Computing device 600 represents a mobile computing device, such as a computing tablet, a mobile phone or smart-phone, a wireless-enabled e-reader, or other wireless mobile device. It will be understood that certain of the components are shown generally, and not all components of such a device are shown in device 600.

Device 600 includes processor 610, which performs the primary processing operations of device 600. In one embodiment, the processor 610 includes the clock distribution network 200/220 discussed herein for managing clock signal propagation on demand.

Referring back to FIG. 6, the processor 610 can include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touch screen (or touch pad) device that provides both output and input to a user.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touch screen, the display device also acts as an input device, which can be at least partially managed by I/O controller 640. There can also be additional buttons or switches on device 600 to provide I/O functions managed by I/O controller 640.

In one embodiment, the I/O controller 640 manages devices such as accelerometers, cameras, light sensors or other environmental sensors, or other hardware that can be included in device 600. The input can be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Memory subsystem 660 includes memory devices for storing information in device 600. Memory can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600.

Elements of embodiments are also provided as a machine-readable medium (e.g., memory 660) for storing the computer-executable instructions (e.g., instructions to implement the flowcharts of FIGS. 4-5 and any other processes discussed above). The machine-readable medium (e.g., memory 660) may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection).

Connectivity 670 includes hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 674 refers to wireless connectivity that is not cellular, and can include personal area networks (such as Bluetooth, Near Field, etc), local area networks (such as Wi-Fi), and/or wide area networks (such as WiMax), or other wireless communication.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audio-visual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. The embodiments of the invention are intended to embrace all such alternatives, modifications, and variations as to fall within the broad scope of the appended claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A processor comprising:
   a plurality of hardware logic units, each of the plurality of hardware logic units having at least one clock island to provide a corresponding clock signal, wherein the plurality of hardware logic units comprise a Mid-Level Cache (MLC), a Lower-Level Cache (LLC), a Floating Point Unit (FPU), an Integer Unit (IU), and a Register File (RF);
   at least one clock spine of a global clock distribution network coupled to the at least one clock island, wherein the at least one clock island is configured to be enabled or disabled independent of other clock islands;
   a pre-fetcher circuit to fetch an upcoming instruction to be executed; and
   a logic unit to determine an indication of clock signal usage in the plurality of hardware logic units, wherein the logic unit includes a shift register to determine when and how long to un-gate the clock signal prior to transmitting the clock signal to the clock island, wherein the logic unit to determine the indication of clock signal usage by identifying how long each hardware logic unit of the plurality of hardware logic units will be active and compute when the clock signal is to be stopped for each hardware logic unit, wherein the logic unit to determine, from an instruction type of the upcoming instruction to be executed, the hardware logic unit to be activated to execute the instruction type.

2. The processor of claim 1, wherein the logic unit to generate an enable signal according to the indication.

3. The processor of claim 2, wherein the logic unit is operable to gate or un-gate the clock signal for the at least one clock island in response to a logic level of the enable signal.

4. The processor of claim 1, wherein the logic unit to identify the set of clock islands independently for each hardware logic unit in parallel.

5. The processor of claim 1, wherein the logic unit to gate the clock signal by gating the clock signal from transmission to the identified clock islands for other hardware logic units.

6. The processor of claim 1, wherein the logic unit to identify another clock island for a hardware logic unit which will be activated to execute the instruction type and un-gate the identified other clock island from transmission to the hardware logic unit.

7. The processor of claim 3, wherein the logic unit to un-gate the clock signal, for the clock island, at least a clock cycle before the clock signal is needed by the hardware logic unit.

8. The processor of claim 3, wherein the logic unit to gate or un-gate the clock signal prior to transmitting the clock signal to the clock island.

9. The processor of claim 1, wherein each of the clock islands independently couples to one or more clock spine networks which are coupled to a clock generator, and wherein the logic unit to gate and un-gate the clock signal in the one or more clock spine networks.

10. The processor of claim 1, wherein the processor is a single processor, and wherein the single processor further comprises:
    one or more hardware processing cores, wherein the multiple hardware logic units are in the one or more hardware processing cores, and wherein the multiple hardware logic units include a floating point unit and an integer unit.

11. A method comprising:
    determining an indication of clock signal usage in a hardware logic unit, wherein hardware logic unit is one of a Mid-Level Cache (MLC), a Lower-Level Cache (LLC), a Floating Point Unit (FPU), an Integer Unit (IU), and a Register File (RF);
    tracking a number of clock cycles needed for the hardware logic unit to be active;
    determining when and how long to gate the clock signal prior to transmitting the clock signal to a clock island of the hardware logic unit based upon the tracked number of clock cycles by
       identifying how long the hardware logic unit will be active, and
       computing when the clock signal is to be stopped for the hardware logic unit;
    gating the clock signal for a clock island of the hardware logic unit in response to the determining, wherein the clock island is a part of a global clock distribution network and to be enabled or disabled independently of other clock islands of the global clock distribution network.

12. The method of claim 11, wherein computing when the clock signal is to be stopped for the hardware logic unit comprises monitoring a pre-fetcher to determine that the hardware logic unit requires a clock signal.

13. The method of claim 12, wherein determining when to gate or un-gate the clock signal prior to transmitting the clock signal to a clock island of the hardware logic unit based upon the tracked number of clock cycles further comprises determining that the hardware logic unit is used to execute an instruction of the pre-fetcher.

14. The method of claim 12, wherein the hardware logic unit is a functional unit.

* * * * *